(12) United States Patent
Freel

(10) Patent No.: US 6,316,040 B1
(45) Date of Patent: Nov. 13, 2001

(54) GRILLED FLAVOR COMPOSITION AND PROCESS TO PRODUCE

(75) Inventor: Barry A. Freel, Greely (CA)

(73) Assignee: Ensyn Technologies, Inc., Ontario (CA)

( * ) Notice: Subject to any disclaimer, the term of this patent is extended or adjusted under 35 U.S.C. 154(b) by 0 days.

(21) Appl. No.: 09/394,224

(22) Filed: Sep. 13, 1999

Related U.S. Application Data

(62) Division of application No. 08/950,355, filed on Oct. 14, 1997, now Pat. No. 5,952,029.

(30) Foreign Application Priority Data

Mar. 10, 1997 (CA) .................................................. 2199577

(51) Int. Cl.⁷ ....................................................... A23L 1/22
(52) U.S. Cl. ..................... 426/533; 426/314; 426/330.6; 426/417; 426/650
(58) Field of Search ..................................... 426/533, 235, 426/314, 330, 330.6, 534, 601, 650, 417

(56) References Cited

U.S. PATENT DOCUMENTS

| 4,571,342 | 2/1986 | DiCicca et al. . |
|---|---|---|
| 4,820,538 | 4/1989 | Schulman et al. . |
| 4,876,108 | 10/1989 | Underwood et al. . |
| 4,994,297 | 2/1991 | Underwood et al. . |
| 5,104,672 | 4/1992 | Chen et al. . |
| 5,292,541 | 3/1994 | Underwood et al. . |
| 5,780,089 | 7/1998 | Lee . |

FOREIGN PATENT DOCUMENTS 0 513 051 B1   12/1994   (EP) .

*Primary Examiner*—Leslie Wong
(74) *Attorney, Agent, or Firm*—Brinks Hofer Gilson & Lione

(57) ABSTRACT

This invention is directed to the production of flavoring compositions obtained by heating a spray or atomized droplets of a saturated or partially saturated vegetable oil to a temperature of at least 480° C. in an oxygen starved atmosphere in a fast pyrolysis reactor within 1.0 second. The process is further characterized in that the vegetable oil and the pyrolysis products produced from the vegetable oil are maintained at over 480° C. for a period of time less than one second, and rapidly quenched, within 0.1 second, and the resulting liquid extract is separated and collected. The flavor compositions of this invention are further characterized in that they comprise a unique composition of flavor notes, and exhibit a full rich flavor complement. These flavor compositions are suitable for use as a food additive in order to enhance or provide food flavoring.

20 Claims, 3 Drawing Sheets

GRILLED FLAVOR COMPOSITION AND PROCESS TO PRODUCE

This application is a division of application Ser. No. 08/950,355, filed Oct. 14, 1997, now issued as U.S. Pat. No. 5,952,029.

This invention relates to a novel process for preparing a novel flavouring composition which is either utilized by itself or is blended with other flavouring compositions to be used to provide a charcoal or grilled flavour to foodstuffs, e.g. beef, fish, poultry, pork, etc.

BACKGROUND OF THE INVENTION

Food flavourings are used in the food industry in a variety of ways. One general type of food flavouring is that which adds grilled or barbeque flavour to foods. Typical grilled flavours include those for the preparation of products wherein the content of meat is reduced or non-existent, for example in sauces, snack foods, meat substitutes, pet foods and the like. Such food flavourings can be sprayed onto the food stuffs, the food can be dipped in a solution of the flavouring, or applied in a variety of different manners. One such composition that provides an aspect of a grill flavour is that disclosed in U.S. Pat. No. 4,571,342 (DiCicca, 1986). This patent describes a flavouring composition with charred flavour notes which is prepared by subjecting a film of fat or oil to temperatures in the range of 150° C. to 475° C. in the presence of oxygen for an effective period of time followed by collecting the fat or oil. The method disclosed in U.S. Pat. No. 4,571,342 involves a continuous flow, thin film apparatus where fat or vegetable oil flows down a tube where a thin film of the fat or vegetable oil is formed around the inside circumference of the tube with a constant flow of air through the centre of the tube. Furthermore, the process is oxidative since heating of the vegetable oil is done in the presence of a substantial amount of oxygen.

A development on the flavouring composition described in U.S. Pat. No. 4,571,342 is disclosed in U.S. Pat. No. 4,820,538 (Schulman, 1989). It is disclosed that when one scales up the DiCicca process, there is an ineffective use of equipment and the reaction is inconsistent. As such, U.S. Pat. No. 4,820,538 teaches use of a rototherm to carry out the reaction in the presence of between 1–1½ parts of oxygen to 1 part fat or oil. Due to the presence of an equimolar ratio or more of oxygen, this reaction is an oxidative reaction carried out in a thin film heat exchanger. The period of time that the thin film remains in the heat exchanger is for a period of not exceeding 2 minutes and normally in the neighbourhood of 90 seconds. Upon exiting the heat exchanger the combustion products are quenched in less than 20 seconds and commonly in about 10 seconds.

This type of charcoal broil flavouring has achieved some commercial success. However, the product that is obtained utilizing this process has a limited flavour profile and level of flavour concentration. In addition, it is always desirable to have available new and different flavour notes that can be used either directly or in a blended form as a grilled food flavouring.

It has been known that some food flavourings can be made utilizing a fast pyrolysis reactor of the types disclosed in U.S. Pat. Nos. 4,876,108 and 4,994,297 (Underwood, 1989 and 1991, respectively). The food flavouring disclosed in U.S. Pat. No. 4,994,297 comprises liquid smoke, obtained from the pyrolysis of wood or cellulose feed stocks, using the method disclosed in U.S. Pat. No. 4,876,108, to produce a flavouring that is related, but quite distinct from the grilled flavourings described herein. The Underwood composition is made utilizing short residence times and is carried out in an oxygen starved atmosphere. Due to the lack of oxygen, the resulting reactions are reductive, not oxidative. For practical reasons, one never achieves a total absence of oxygen in such a process due to the partial difficulties of voiding all oxygen from a reactor system and therefore it would be understood that an oxygen starved atmosphere would have a limited amount of oxygen, i.e. less than 4% molar ratio of oxygen to feed stock.

The product made in accordance with the disclosure of U.S. Pat. Nos. 4,876,108 and 4,994,297 has also achieved a fair amount of commercial success primarily as a meat flavouring composition having considerable browning characteristics, but does not provide flavour notes that extend beyond those associated with smoked flavours. In U.S. Pat. No. 5,292,541 there is disclosed the production of a food browning material prepared from the pyrolysis of a sugar or starch feed stock. This product, while useful as a browning agent, lacks any appreciable flavouring ability and it is therefore quite distinct from the food flavouring as disclosed herein.

SUMMARY OF THE INVENTION

This invention is directed to the production of unique flavouring compositions. More specifically, this invention is related to the production of flavouring compositions with unique flavour notes using fast pyrolysis reactors and high stability vegetable oils or fats as feed stock.

It has unexpectedly been observed that use of apparatus of the type described in the Underwood patent (U.S. Pat. No. 4,994,297, which is incorporated by reference), but utilizing as feed stock high stability vegetable oils or fats, instead of wood, results in flavouring compositions having uniquely distinct grilled flavour notes that are extremely smooth and lack harsh flavour notes. These flavour notes are distinct from the flavour notes or characteristics achieved using the similar feedstock in the apparatus and process of the DiCicca (U.S. Pat. No. 4,571,342) and Schulman (U.S. Pat. No. 4,820,538) patents. The distinct differences in flavour and enhanced concentration indicates that a new and different composition results from the present process. Such a unique grilled flavouring is highly desirable for use in the food flavouring industry, since a reduced amount of flavouring (additive) can be used to achieve the desired flavouring. In addition, more pronounced flavouring can be achieved using equivalent amounts to other available grill flavourings.

The present invention utilizes high stability vegetable oils, that is to say, saturated, or partially saturated vegetable oils. It has been determined that saturated or partially saturated vegetable oils achieve a usable product whereas the utilization of unsaturated vegetable oils including some of those disclosed in the DiCicca and Schulman patents result in products having harsh flavour notes and are unacceptable. Furthermore, the enhanced flavour profile and higher flavour concentrations of the flavouring compositions of this invention are obtained through a fast pyrolysis reactor operating in the relative absence of air and at elevated temperatures. No flavour precursors were necessary to enhance the meaty flavour notes of the disclosed flavour compositions.

Therefore, this invention relates to a process for the preparation of a flavouring comprising:

a) heating a spray or atomized droplets of a saturated or partially saturated vegetable oil to a temperature of at least 480° C. in an oxygen starved atmosphere in a fast pyrolysis system within 1.0 second;

b) maintaining the vegetable oil together with the pyrolysis products produced from the vegetable oil, at over 480° C. for a period of time less than one second;

c) rapidly quenching the pyrolysis products formed within 0.1 second;

d) separating and collecting said liquid extract.

This invention also embraces a process as defined above, wherein the vegetable oil is selected from the list comprising saturated or partially saturated palm oil, soya oil, peanut oil, canola, corn oil, coconut oil, animal fats, beef tallow, or butter. Furthermore, this invention relates to the use of saturated or partially saturated soya oil within this process.

This invention also provides a grilled flavouring composition which is made in accordance with the process as defined above. Furthermore, this invention is directed to a flavouring composition characterized in that it comprises a compound mix resulting in a gas chromatography fingerprint as that of Table 1.

Furthermore, this invention embraces a grilled flavouring composition which contains the flavouring composition made by the process as defined above. This flavouring may be in a liquid, solid, cream, paste or powdered form, or in a spray dried form associated with an appropriate carrier such as malto dextrin or starch.

This invention also relates to a food flavouring comprising the grilled flavouring composition defined above together with other suitable food additives. This flavouring may be in a liquid, solid, sauce, cream, paste or powdered form.

This invention is directed to food to which has been applied the food flavouring defined above. This food is selected from, but not exclusively limited to, meat, poultry, sea food, milk products, vegetables, deep fried, surface fried, baked, microwaved, barbequed, grilled or snack foods.

This invention is directed to a flavouring composition characterized by a gas chromatography (GC) elution profile which comprises at least seven compounds selected from the group consisting of the following approximate GC elution times (in minutes): 5.21; 6.49; 7.59; 8.69; 8.8; 9.97; 10.05; 10.21; 10.78; 11.18; 11.84; 12.2; 12.33; 12.84; 13.0; and 13.62. More specifically, embodiments of this invention include flavouring composition comprising a combination of compounds that give rise to a gas chromatography (GC) elution profile which approximates that of Table 1 ("Flavour composition"), or Table 4 ("Reaction temperature: 500° C." or "560° C.", or Table 6 ("Reaction temperature 500° C." or "560° C.").

This invention also embraces food flavouring compositions, comprising the flavouring composition defined above together with other suitable food additives. This flavouring may be in a liquid, solid, sauce, cream, paste or powdered form.

Furthermore, this invention is directed to food to which has been applied the flavouring composition defined above. The food is selected from, but not exclusively limited to, meat, poultry, sea food, milk products, vegetables, deep fried, surface fried, baked, microwaved, barbequed, grilled, or snack foods.

BRIEF DESCRIPTION OF THE DRAWINGS

These and other features of the invention will become more apparent from the following description in which reference is made to the appended drawings wherein.

DESCRIPTION OF PREFERRED EMBODIMENT

In the following description, the corresponding elements, as shown in each figure of the drawings, are given the same reference number.

We have observed that the use of apparatus of the type described in the Underwood patent (U.S. Pat. No. 4,994,297, which is incorporated by reference), utilizing as feed stock high stability vegetable oils or fats, instead of wood, results in flavouring compositions having uniquely distinct grilled flavour notes that are extremely smooth and lack harsh flavour notes. These flavour notes are distinct from the flavour notes or characteristics achieved using the similar feedstock in the apparatus and process of the DiCicca (U.S. Pat. No. 4,571,342) and Schulman (U.S. Pat. No. 4,820,538) patents.

Figure 1:
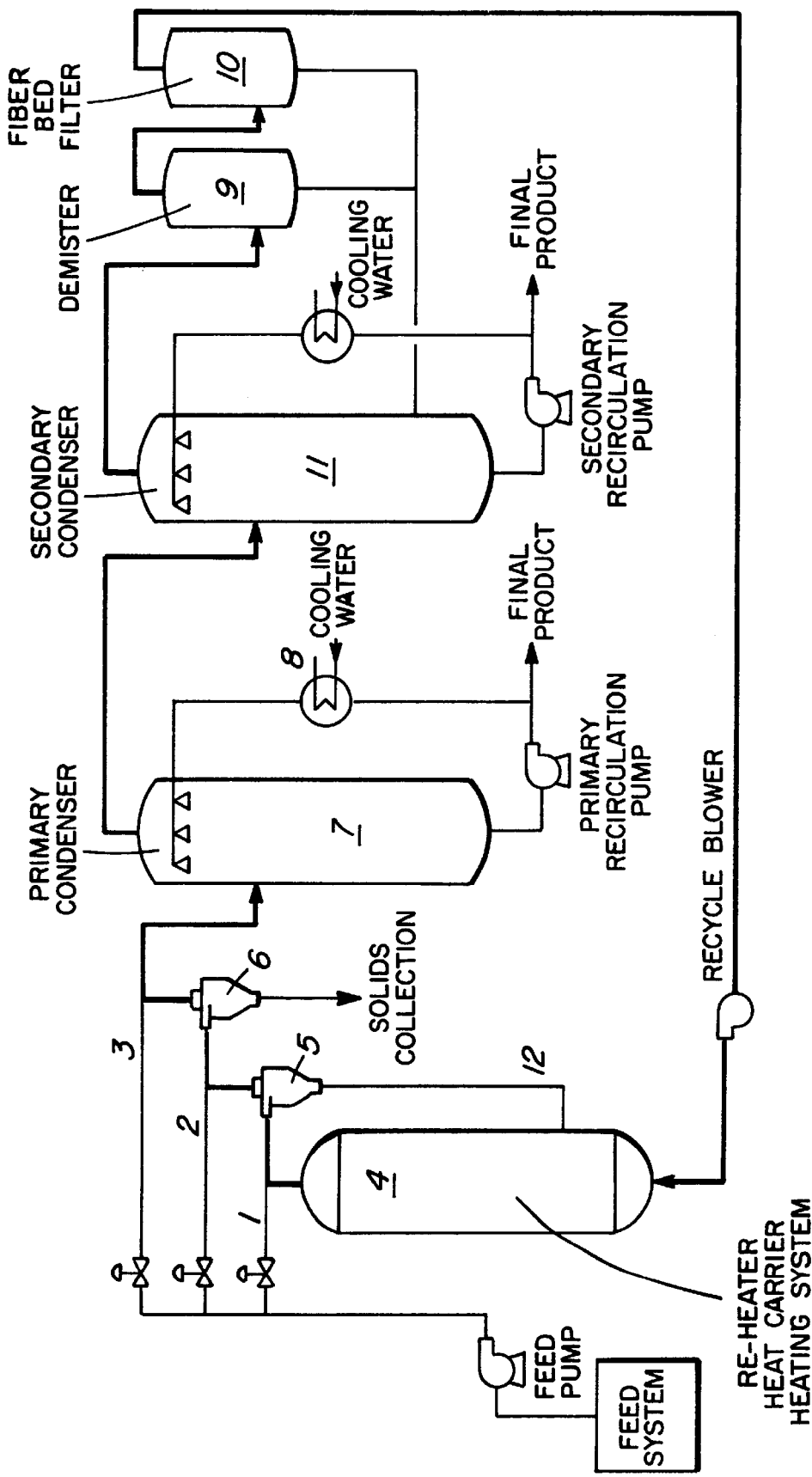
FIG. 1 is a schematic of one fast pyrolysis process that can be utilized to produce grilled flavoured composition.

FIG. 1 discloses a schematic of a transport fast pyrolysis reactor of type that can be utilized to make the grilled flavourings of the present invention. The feed stream of vegetable oil or fat enters the reactor radially through an animization nozzle (1) which is positioned just prior to the solid heat carrier separator, and/or just after the solid heat carrier separator, position (2), and/or just after the secondary solid separator, position (3). A heat-carrier (hot sand, other solid, or hot carrier gas) is transported in a fluid (recirculation gas or nitrogen with up to 4% molar residual oxygen which is present from pressure tap purge ports; see below) and comes in contact with the atomized feedstock at any one of the entry points. A preferred heat carrier is that of hot sand.

In the reaction zones there is thorough and rapid mixing and conductive heat transfer from the heat carrier to the oil as the heat carrier transport gas and feed stock, with pyrolysis products, travels through the reactor system. Preferred ratios of the mass of the heat carrier to the mass of the feedstock, for example of sand:oil, are of about 20:1 to 50:1. In section (4) of the system the heat carrier is brought up to the desired approach temperature by means of electrical resistance heating, indirect combustion, direct combustion or a combination thereof. At the exit of the heat carrier heating system (4) the solid heat-carrier is quickly removed using a high-efficiency cyclone (5). Any fine solids which might avoid separation in this device are removed in a secondary separation means (6). After separation from the heat carrier, the pyrolysis products are rapidly quenched, resulting in an extremely short overall reaction residence time for the feedstock at the elevated temperatures.

The heat carrier together with other solids which are removed by the cyclonic separator are transferred to a heat carrier re-heating system (4). A noncondensible gas which is a byproduct of the high temperature reactions, is compressed in a blower and transferred to the re-heater (4) along with the solid heat carrier. In the re-heater (4), any organic deposits on the sand particles that were not removed in the cyclone separator, can be efficiently combusted by the addition of oxygen to the recirculation line (12) to help provide process heat and rid the sand of contaminants. Byproduct gases can also be combusted in the re-heater (4) to add to the reaction thermal energy demand.

Immediate quenching of the hot product gaseous/vapour stream from the cyclonic separators occurs in a direct contact condensing system (7). A pump draws condensed liquid from the bottom of the condensing column and passes it through a heat exchanger (8). The cool product liquid is then sprayed back to the top of the direct contact column (7). Any liquids which are carried out of the direct contact collection system are removed in stainless steel demister (9) and fibreglass filter (10). Utilization of a secondary condenser (11) can also be used in order to improve the efficiency of the process.

The system operates between 485° C. and 550° C. with a vapour residence time of less than 1.0 seconds and it preferred a vapour residence time of between 50 to 300 milliseconds. The "vapour residence time" is defined as the period of time from the point at which the feed stock comes into contact with the hot inert heat carrier to the time that it is separated from the heat carrier and cooled in the primary condensers.

In any system of fast pyrolysis it is important to recognize that it is the entire period of time at which the feed stock and pyrolysis products are maintained at elevated temperatures that is critical. Any processes which can minimize this period of time will result in a preferred fast pyrolysis system.

The appropriate vegetable oils that are utilized in the present invention are those having a high stability, namely, those vegetable oils that are saturated or are partially saturated. Examples of appropriate vegetable oils would be saturated or partially saturated palm oil, soya oil, peanut oil, canola, corn oil or coconut oil. Alternative feedstocks include animal fats such as butter, beef tallow, etc. However, use of unsaturated vegetable oils results in unwanted side reactions which transform the pyrolysis products into undesirable tars, etc, and is to be avoided.

The process is conducted in a reductive atmosphere that is essentially free of oxygen or air. The only oxygen present is that which is necessary for pressure tap purging, or residual amounts that enter the system by reason of system limitations or leaks.

According to the present invention by "flavour note" it is meant the compound that gives rise to a flavour component of the compositions of this invention. The term "flavour note" and "compound" are used interchangeably. Specific flavour notes can be identified by analytical means such as detection following gas chromatography by a suitable detector, or by smell, or taste. Chemical analysis of the grilled flavouring composition made utilizing the present invention is set out in Table 2 (see Example 1, below). For comparative purposes, an analysis of the product made utilizing the Schulman patent is also set out.

It can be seen from Table 2 that the flavour notes that result from the present invention are markedly different from those obtained using the Schulman process even when using the same feedstock. In particular, in a comparative taste test panel, it was noted that the flavour profile of the present invention was more enhanced and of a rich, higher concentration (approximately twice as strong).

The process of the present invention is to be conducted at temperatures over 480° C. (900° F.) and preferably over 500° C. to 550° C. (930–1020° F.). While the precesses of Schulman and DiCicca are performed at lower temperature ranges, in the order of 315–370° C. (600–700° F.), and 150–475° C. (300–890° F.), respectively.

By reason of the absence or essential absence of oxygen from the reaction zone, the present process is endothermic, and it is a non-combustion process. This results in an entirely different series of reactions resulting in different products than those achieved utilizing the Schulman process. In addition, the shorter residence time and rapid quenching, result in a different product profile as is exemplified in Table 2.

The flavour compositions that are made utilizing the present invention are very strong and distinctive and as such, can be added with other flavourings resulting in a blended product. In addition, the product of the present invention can be utilized in a spray dried form associated with an appropriate carrier such as malto dextrin, starches, or other carriers as would be known to one of skill in the art. The blended product can then be applied to meats and other food stuffs, including but not limited to, milk products, vegetables, deep fried, surface fried, baked, microwaved, barbequed, grilled, or snack foods, and sea foods for which it is desired to produce an enhanced flavour.

In addition, a blended flavouring can be sold directly to consumers, in the form of a liquid, solid, powder, paste, sauce, or cream for applications to meats and other foods that are to be prepared. The grill flavourings of this invention and blends containing these flavourings can also be sold as microwave browners and flavour additives.

This invention will now be further described by references to the following examples:

EXAMPLE 1

The procedure of Underwood, U.S. Pat. No. 4,994,297, which is incorporated by reference, with the following feedstock was employed for this example.

A mixture of partially hydrogenated soy and cottonseed oil (see Table 1, below), was processed in the reaction system. The mixture was preheated to approximately 40° C. (for ease of pumping), and injected into the reaction vessel. The reactor was maintained at a temperature of 504° C. The reaction residence time was determined to be 211 milliseconds (i.e., for the time of injection to the time of rapid quenching). The resultant liquid material was taste tested and found to possess a char-grilled flavour, suitable for application to foods.

TABLE 1

Fatty acid profile and specifications of partially hydrogenated soy and cottonseed oil

| Carbon Number | % |
|---|---|
| 12:0 | 1 |
| 14:0 | 1 |
| 16:0 | 9 |
| 16:1 | 1 |
| 18:0 | 5 |
| 18:1 | 5 |
| 18:2 | 78 |
| 18:3 | trace |
| Iodine value | 74–81 |
| Flavour | bland |
| Smoke point | 420–450° F. |

Characterization of Reaction Product

A sample of the product was extracted in propylene glycol and analysed using gas chromatography. For comparison, a sample of a commercially available natural grill flavour, prepared using the Schulman process with a feed stock comprising partially hydrogenated soybean/cottonseed oil and extracted in propylene glycol, was also analysed. A Varian Star 3400CX gas chromatograph was used, fitted with a 30 meter×0.25 mm I.D., 0.25 micron film thickness, J&W Scientific fused silica DB-Wax capillary column (catalog number #122-7032). The column was run at 40° C. initial temp and ramped to 220° C. at 10° C./min with a 5 minute hold at 220° C. The carrier gas was hydrogen at 25 PSIG, and 1 microliter samples were injected onto the column.

Figure 2A:
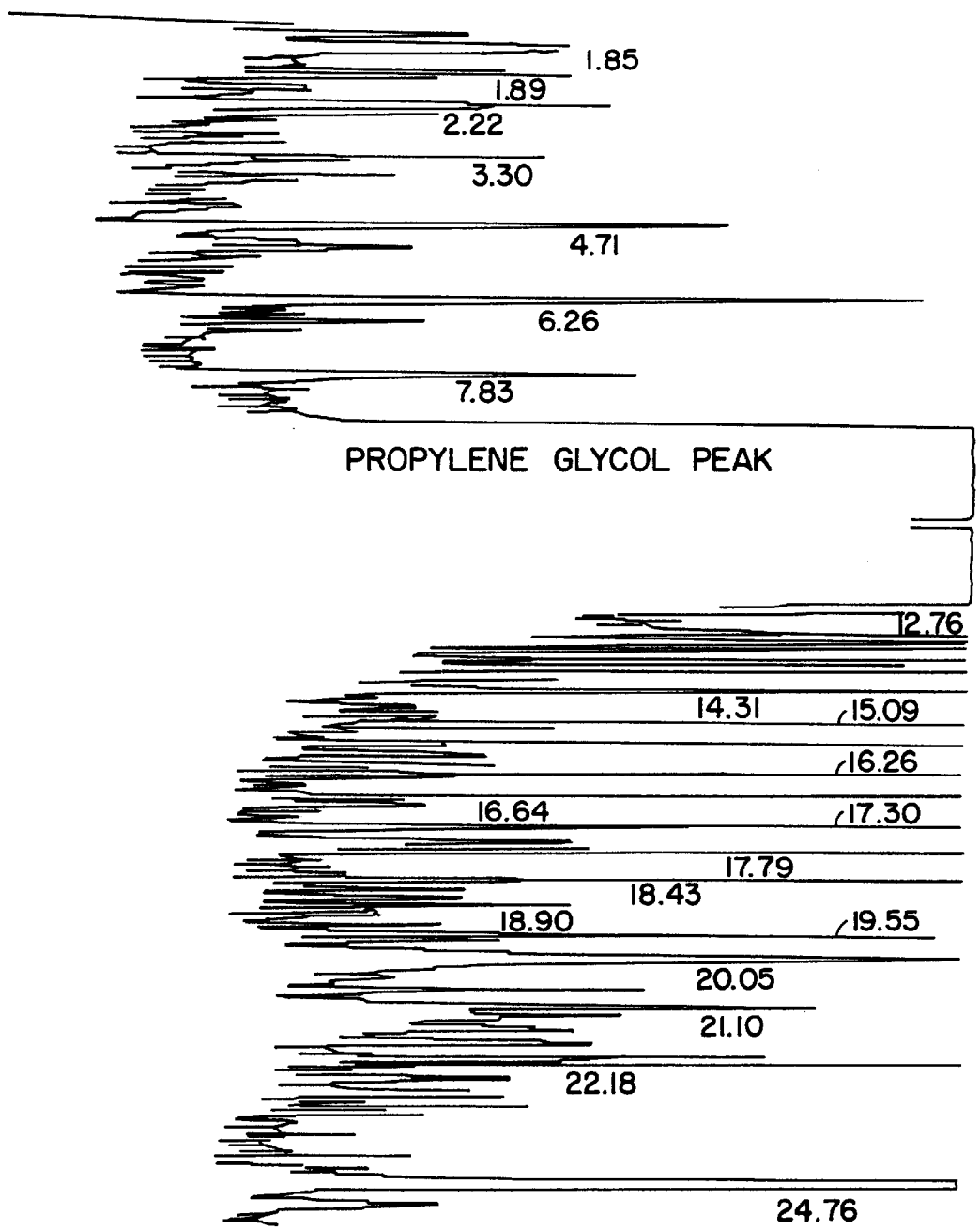
FIG. 2 is a gas chromatography profile of (2A) a product of this invention; and a profile of (2B) a commercially available product produced using the process as disclosed in Schulman (U.S. Pat. No. 4,820,538).
Figure 2B:
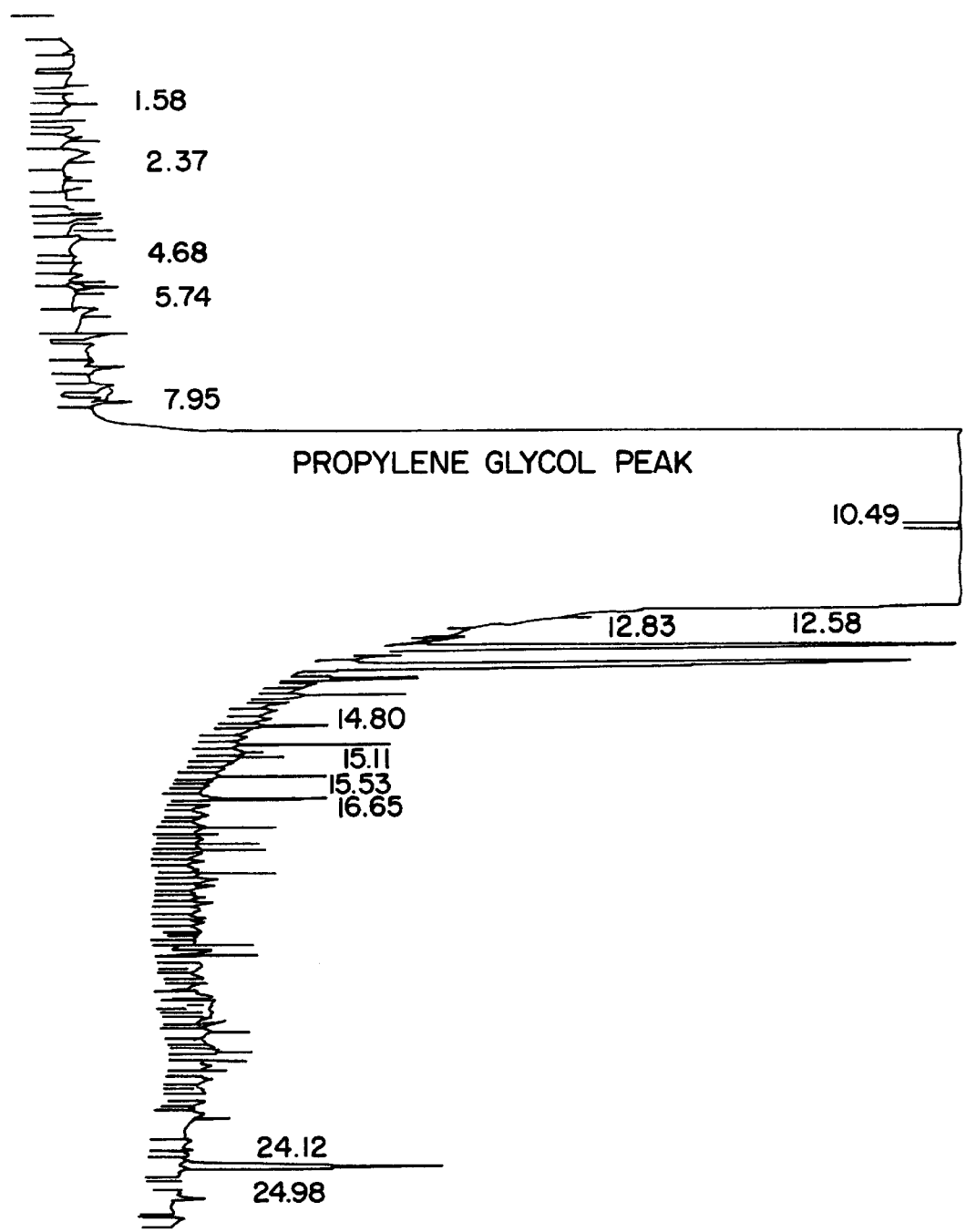

Results of the peak areas are indicated in Table 2, as are compounds that are of importance to the natural grill flavour. These compounds were determined by smelling each peak as it eluted from the GC through a heated "sniff port". Comparisons of the gas chromatography profiles are provided in FIG. 2A (the product of this example) and FIG. 2B (the commercially available product).

TABLE 2

Gas Chromatograph Area Counts From Water Extractions of products derived from partially hydrogenated soy and cottonseed oil prepared by the process of this invention ("Flavour composition") or by the process of U.S. Pat. No. 4,820,538 ("Commercial product").

| Time (min) | Important Flavour Notes | Peak Areas: Flavour composition | Peak Areas: Commercial product |
|---|---|---|---|
| 0.969 | | 44 | |
| 1.064 | | 4779 | 7339 |
| 1.416 | | 46 | |
| 1.809 | | 31 | |
| 2.134 | | 31 | |
| 2.543 | | 38 | |
| 2.583 | | 29 | |
| 3.153 | | 41 | |
| 4.379 | | 34 | |
| 4.538 | | 43 | |
| 4.632 | | 29 | |
| 4.736 | | 36 | |
| 4.808 | | 24 | |
| 5.212 | * | 92 | 92 |
| 6.199 | | 37 | |
| 6.493 | * | 546 | 248 |
| 6.656 | | 60 | 71 |
| 7.094 | | 22 | 74 |
| 7.59 | * | 234 | 101 |
| 8.254 | | 42 | |
| 8.36 | | 28 | 150 |
| 8.492 | | 28 | |
| 8.568 | | 82 | 165 |
| 8.685 | * | 189 | 81 |
| 8.797 | * | 350 | 95 |
| 9.003 | | 31 | |
| 9.098 | | 21 | |
| 9.177 | | 41 | |
| 9.972 | * | 184 | 61 |
| 10.053 | * | 241 | |
| 10.21 | * | 54 | |
| 10.368 | | 34 | |
| 10.784 | * | 168 | |
| 10.951 | | 43 | |
| 11.179 | * | 110 | |
| 11.519 | | 35 | |
| 11.839 | * | 141 | |
| 12.202 | * | 36 | |
| 12.325 | * | 33 | |
| 12.782 | | 47 | |
| 12.835 | * | 59 | |
| 13.005 | * | 101 | |
| 13.381 | | 22 | |
| 13.623 | * | 56 | |
| 14.038 | | 42 | |
| 14.296 | | 36 | |
| 14.435 | | 26 | |
| 14.594 | | 50 | |
| 15.196 | | 27 | 64 |
| 15.354 | | 76 | 55 |
| 16.116 | | 22 | |
| 16.296 | | 30 | 240 |
| 16.586 | | 48 | |
| 17.253 | | 20 | 76 |
| 17.294 | | 27 | |
| 17.542 | | 36 | |
| 18.137 | | 38 | |
| 18.185 | | 24 | |
| 18.744 | | 48 | |
| 19.102 | | 48 | |
| 19.682 | | 520 | |

TABLE 2-continued

Gas Chromatograph Area Counts From Water Extractions of products derived from partially hydrogenated soy and cottonseed oil prepared by the process of this invention ("Flavour composition") or by the process of U.S. Pat. No. 4,820,538 ("Commercial product").

| Time (min) | Important Flavour Notes | Peak Areas: Flavour composition | Peak Areas: Commercial product |
|---|---|---|---|
| 20.098 | | 26 | |
| 22.325 | | 48 | |
| 22.177 | | 34 | |
| Total Area | | 9,631 | 8,912 |

As can be seen from Table 2 and FIG. 2, the product of this example comprises a more complex GC peak profile when compared with the commercially available product. Furthermore, this product has a greater variety of important flavour notes. A comparison of the peak areas of the GC profiles of the important flavour notes indicates up to a two fold increase in the product produced by this example (e.g. compare peaks areas at 6.493 min of 546 v 248 etc.). Furthermore, the commercially available product lacks the compliment of compounds eliciting important flavour notes observed after elution times greater than 10 min.

EXAMPLE 2

A pure soybean oil (see Table 3) was processed under similar conditions to Example 1, at two different reactor temperatures of 500° C. and 560° C.

TABLE 3

Soybean Oil Specifications

| Colour | 15-Yellow - 1.5 Red max |
|---|---|
| Flavour | bland |
| Iodine value | 124–139 |
| Smoke point | 218° C. min |

The reaction conditions were as follows:

| Reactor temperature | 500° C. or 560° C. |
|---|---|
| Residence time | 151 ms |
| Reactor velocity | 61.6 ft/s |
| Feed Throughput rate | 2600 lb/hr-ft$^2$ |

The resultant products were analysed by GC (Table 4)

TABLE 4

Gas Chromatograph Area Counts From Water Extractions of Products derived from Soybean Oil

| Time | Important Flavour Notes | Reaction temperature: 500° C. | 560° C. |
|---|---|---|---|
| 0.969 | | 624 | 608 |
| 1.064 | | 2777 | 2824 |
| 1.416 | | | |
| 1.809 | | | 27 |
| 2.134 | | | 19 |
| 2.543 | | 18 | 55 |
| 2.583 | | | |
| 3.153 | | | 14 |
| 4.379 | | | |

TABLE 4-continued

Gas Chromatograph Area Counts From Water Extractions of Products derived from Soybean Oil

| Time | Important Flavour Notes | Reaction temperature: 500° C. | 560° C. |
|---|---|---|---|
| 4.538 | | | |
| 4.632 | | | |
| 4.736 | | | 23 |
| 4.808 | | | |
| 5.212 | * | | 37 |
| 6.199 | | | |
| 6.493 | * | 85 | 136 |
| 7.094 | | | |
| 7.59 | * | 36 | 102 |
| 8.254 | | | |
| 8.36 | | | |
| 8.492 | | | |
| 8.568 | | | |
| 8.685 | * | 36 | 180 |
| 8.797 | * | 40 | 64 |
| 9.003 | | | |
| 9.098 | | | |
| 9.177 | | | |
| 9.972 | * | 17 | 55 |
| 10.053 | * | 38 | 53 |
| 10.21 | * | 12 | 17 |
| 10.368 | | | |
| 10.784 | * | 31 | 41 |
| 10.951 | | | |
| 11.179 | * | 14 | 47 |
| 11.519 | | | 18 |
| 11.839 | * | 24 | 43 |
| 12.202 | * | 25 | |
| 12.325 | * | 36 | 128 |
| 12.782 | | | |
| 12.835 | * | 15 | 28 |
| 13.005 | * | 20 | 73 |
| 13.381 | | | |
| 13.623 | * | | |
| 14.038 | | | |
| 14.296 | | | |
| 14.435 | | | |
| 14.594 | | | |
| 15.196 | | | |
| 15.354 | | | |
| 16.116 | | | |
| 16.296 | | 69 | 66 |
| 16.586 | | | |
| 17.253 | | | |
| 17.294 | | | |
| 17.542 | | | |
| 18.137 | | | |
| 18.185 | | | |
| 18.744 | | | |
| 19.102 | | | |
| 19.682 | | | |
| 20.098 | | | |
| 22.325 | | 119 | |
| 22.177 | | | 55 |
| Total Area | | 4,096 | 5,156 |

The resultant liquid product of resulting form either reaction run had a sharper taste and lacked the broad flavour profile of Example 1. However, it still exhibited the char-grilled flavour of Example 1. It can also be seen that the composition of the 560° C. reaction temperature product comprises higher levels of compounds than that of the lower, 500° C., run.

EXAMPLE 3

A pure canola oil feedstock (see Table 5) was processed under similar conditions referred to in Example 1, at 500° C. and 560° C. with a reactor residence time of 130 ms. The feedstock was atomized and injected into the reactor followed by rapid quenching. The resultant liquid product was subsequently taste tested and analysed by GC (Table 6). The flavour profile exhibited some meaty flavour notes, however, it was found to be much weaker than the flavour composition of Example 1.

TABLE 5

Canola Oil Specifications

| Colour | 15 Yellow - 1.5 Red max |
|---|---|
| Flavour | bland |
| Iodine value | 110–126 |
| Smoke point | 218° C. |

Products analysed by GC (Table 6) indicate the presence of different amounts of between the two reaction temperature runs. An increase in the amount and occurrence of important flavour notes is observed with flavour composition produced by the higher reaction temperature run.

TABLE 6

Gas Chromatograph Area Counts From Water Extractions of Canola Oil

| Time | Important Flavour Notes | Reaction temperature: 500° C. | 560° C. |
|---|---|---|---|
| 0.969 | | | |
| 1.064 | | 3336 | 3462 |
| 1.416 | | | |
| 1.809 | | | |
| 2.134 | | | |
| 2.543 | | | 11 |
| 2.583 | | | |
| 3.153 | | | |
| 4.379 | | | |
| 4.538 | | | |
| 4.632 | | | |
| 4.736 | | | |
| 4.808 | | | |
| 5.212 | * | | 14 |
| 6.199 | | | |
| 6.493 | * | 26 | 31 |
| 6.656 | | | |
| 7.094 | | | |
| 7.59 | * | | 18 |
| 8.254 | | | |
| 8.36 | | | |
| 8.492 | | | |
| 8.568 | | | |
| 8.685 | * | 46 | 37 |
| 8.797 | * | | |
| 9.003 | | | |
| 9.098 | | | |
| 9.177 | | | |
| 9.972 | * | | |
| 10.053 | * | | |
| 10.21 | * | | |
| 10.368 | | | |
| 10.784 | * | | |
| 10.951 | | | |
| 11.179 | * | 24 | 11 |
| 11.519 | | | |
| 11.839 | * | | 12 |
| 12.202 | * | 16 | 65 |
| 12.325 | * | 97 | |
| 12.782 | | | |
| 12.835 | * | 40 | |
| 13.005 | * | 39 | 56 |
| 13.381 | | | |
| 13.623 | * | | |
| 14.038 | | | |
| 14.296 | | | |
| 14.435 | | | |
| 14.594 | | | |

TABLE 6-continued

Gas Chromatograph Area Counts From Water Extractions of Canola Oil

| Time | Important Flavour Notes | Reaction temperature: 500° C. | 560° C. |
|---|---|---|---|
| 15.196 | | | |
| 15.354 | | | 20 |
| 16.116 | | | |
| 16.296 | 61 | | 65 |
| 16.586 | | | |
| 17.253 | | | |
| 17.294 | | | |
| 17.542 | | | |
| 18.137 | | | |
| 18.185 | | | |
| 18.744 | | | |
| 19.102 | | | |
| 19.682 | | | |
| 20.098 | | | |
| 22.325 | | | 26 |
| 22.177 | | | |
| Total Areas | | 3,745 | 3,896 |

EXAMPLE 4

A blended product was produced to achieve a grilled flavouring food that resembled the product of Example 1 but having a slightly mellower flavour. This was achieved by adding feed stock comprising 80% hydrogenated soy and cottonseed oil (see Example 1, Table 1 for specifications) and 20% soybean oil (see Example 2, Table 3 for specifications). The feedstock was processed at 500° C. with a reactor residence time of 170 ms. The feedstock was atomized and injected into the reactor followed by rapid quenching. The resultant liquid product was taste tested. The flavour profile was weaker than that observed with the product of Example 1, and exhibited more mellow overtones.

The present invention has been described with regard to preferred embodiments. However, it will be obvious to persons skilled in the art that a number of variations and modifications can be made without departing from the scope of the invention as described in the following claims.

The embodiments of the invention in which an exclusive property of privilege is claimed are defined as follows:

1. A flavouring composition made in accordance with the following process:
    a) heating a spray or atomized droplets of a saturated or partially saturated vegetable oil to a temperature of at least 480° C. in an oxygen starved atmosphere in a fast pyrolysis system within 1.0 second to produce pyrolysis products;
    b) maintaining said vegetable oil together with said pyrolysis products produced from said vegetable oil, at over 480° C. for a period of time less than one second;
    c) rapidly quenching said pyrolysis products within 0.1 second to produce a liquid extract;
    d) separating and collecting said liquid extract.

2. The flavouring composition of claim 1 wherein, in said step of heating, said vegetable oil is selected from the group comprising saturated or partially saturated palm oil, soya oil, peanut oil, canola, corn oil, and coconut oil.

3. A food flavouring comprising the flavouring composition of claim 1 together with other suitable food additives.

4. A food flavouring comprising the flavouring composition of claim 2 together with other suitable food additives.

5. The flavouring composition of claim 1 wherein the flavouring composition is in a liquid, solid, cream, sauce, paste, powdered or a spray dried form, associated with appropriate carriers.

6. The flavouring composition of claim 2 wherein the flavouring composition is in a liquid, solid, cream, sauce, paste, powdered or a spray dried form, associated with appropriate carriers.

7. The food flavouring composition of claim 3 wherein the flavouring composition is in a liquid, solid, cream, paste, powdered or a spray dried form, associated with appropriate carriers.

8. The food flavouring composition of claim 4 wherein the flavouring composition is in a liquid, solid, cream, paste, powdered or a spray dried form, associated with appropriate carriers.

9. Food to which has been applied the flavouring composition of claim 1.

10. The food of claim 9 which is selected from meat, poultry, sea food, milk products, vegetables, deep fried, surface fried, baked, micro waved, barbequed, grilled, or snack foods.

11. The flavouring composition of claim 2 wherein the vegetable oil is saturated or partially saturated soya oil.

12. A flavouring composition from pyrolyzed vegetable oil comprising at least seven compounds selected from the group consisting of the following compounds characterized by the following gas chromatography elution times (in minutes): 5.21; 6.49; 7.59; 8.69; 8.8; 9.97; 10.05; 10.21; 10.78; 11.18; 11.84; 12.2; 12.33; 12.84; 13.0; and 13.62, wherein said elution times are in reference to being performed on a gas chromatograph using a silica DB-wax capillary column run at 40° C. and ramped to 220° C. at 10° C./min. with a 5 minute hold at 220° C., using hydrogen at 25 psig as a carrier gas, and wherein said gas chromatograph is calibrated to elute a propylene glycol peak at about 10.49 minutes.

13. The flavouring composition of claim 12 comprising a combination of compounds that give rise to a gas chromatography (GC) elution profile with the following elution times (in minutes): 5.21; 6.49; 7.59; 8.69; 8.8; 9.97; 10.05; 10.21; 10.78; 11.18; 11.84; 12.2; 12.33; 12.84; 13.0; and 13.62.

14. The flavouring composition of claim 12 comprising a combination of compounds that give rise to a gas chromatography (GC) elution profile with the following elution times (in minutes): 6.49; 7.59; 8.69; 8.8; 9.97; 10.05; 10.21; 10.78; 11.18; 11.84; 12.2; 12.33; 12.84; and 13.0.

15. The flavouring composition of claim 12 comprising a combination of compounds that give rise to a gas chromatography (GC) elution profile with the following elution times (in minutes): 5.21; 6.49; 7.59; 8.69; 8.8; 9.97; 10.05; 10.21; 10.78; 11.18; 11.84; 12.33; 12.84; and 13.0.

16. The flavouring composition of claim 12 comprising a combination of compounds that give rise to a gas chromatography (GC) elution profile with the following elution times (in minutes): 6.49; 8.69; 11.18; 12.2; 12.33; 12.84; and 13.0.

17. The flavouring composition of claim 12 comprising a combination of compounds that give rise to a gas chromatography (GC) elution profile with the following elution times (in minutes): 5.21; 6.49; 7.59; 8.69; 11.18; 11.84; 12.2; 12.33; and 13.0.

18. The flavouring composition of claim 12 wherein the flavouring composition is in a liquid, solid, cream, sauce, paste, powdered, or a spray dried form, associated with appropriate carriers.

19. Food to which has been applied the flavouring composition of claim 18.

20. The food of claim 19 which is selected from meat, poultry, sea food, milk products, vegetables, deep fried, surface fried, baked, micro waved, barbequed, grilled, or snack foods.

* * * * *